United States Patent
Park et al.

(10) Patent No.: US 10,847,760 B2
(45) Date of Patent: Nov. 24, 2020

(54) BATTERY MODULE HAVING HEAT PIPE AND BATTERY PACK INCLUDING THE SAME

(71) Applicant: LG CHEM, LTD., Seoul (KR)

(72) Inventors: Ji-Soo Park, Daejeon (KR); Jin-Oh Yang, Daejeon (KR); Seog-Jin Yoon, Daejeon (KR)

(73) Assignee: LG Chem, Ltd., Seoul (KR)

(*) Notice: Subject to any disclaimer, the term of this patent is extended or adjusted under 35 U.S.C. 154(b) by 127 days.

(21) Appl. No.: 16/186,918

(22) Filed: Nov. 12, 2018

(65) Prior Publication Data

US 2019/0148681 A1    May 16, 2019

(30) Foreign Application Priority Data

Nov. 13, 2017  (KR) ................. 10-2017-0150681
Jul. 25, 2018  (KR) ................. 10-2018-0086714

(51) Int. Cl.
  *H01M 2/02* (2006.01)
  *H01M 10/613* (2014.01)
  *H01M 10/6552* (2014.01)
  *H01M 2/10* (2006.01)
  *H01M 10/643* (2014.01)
  *H01M 10/6557* (2014.01)

(52) U.S. Cl.
  CPC ......... *H01M 2/022* (2013.01); *H01M 2/1016* (2013.01); *H01M 10/613* (2015.04); *H01M 10/643* (2015.04); *H01M 10/6552* (2015.04); *H01M 10/6557* (2015.04); *H01M 2200/10* (2013.01)

(58) Field of Classification Search
  CPC .. H01M 2/022; H01M 2/1016; H01M 10/613; H01M 10/643; H01M 10/6552; H01M 10/6557
  See application file for complete search history.

(56) References Cited

U.S. PATENT DOCUMENTS

| 8,263,250 | B2 | 9/2012 | Hermann |
| 8,475,952 | B2 | 7/2013 | Yasui et al. |
| 9,257,684 | B2 | 2/2016 | Hamada et al. |
| 9,799,931 | B2 | 10/2017 | Hamada et al. |

(Continued)

FOREIGN PATENT DOCUMENTS

| JP | H11-204151 A | 7/1999 |
| JP | 2002-373708 A | 12/2002 |

(Continued)

*Primary Examiner* — Jimmy Vo
(74) *Attorney, Agent, or Firm* — Morgan, Lewis & Bockius LLP

(57) ABSTRACT

A battery module includes a plurality of cylindrical battery cells; a module housing having an accommodation portion formed therein to accommodate the plurality of cylindrical battery cell; and a heat pipe having an outer wall to form a sealed tube structure. The tube structure includes a coolant therein, and the heat pipe includes a wick located to surround an inner wall of the tube structure and having a plurality of micropores formed therein. The heat pipe extends in a horizontal direction along the plurality of cylindrical battery cells. The heat pipe has a plate shape and stands so that both surfaces thereof are oriented in a horizontal direction. The battery module has improved heat balance.

17 Claims, 13 Drawing Sheets

(56) References Cited

U.S. PATENT DOCUMENTS

| | | | |
|---|---|---|---|
| 9,847,182 B2 | 12/2017 | Kusaba et al. | |
| 2010/0104938 A1* | 4/2010 | Hermann | H01M 2/1077 |
| | | | 429/120 |
| 2011/0008667 A1* | 1/2011 | Kwag | H01M 10/6556 |
| | | | 429/123 |
| 2012/0021260 A1* | 1/2012 | Yasui | H01M 10/643 |
| | | | 429/53 |
| 2017/0194675 A1* | 7/2017 | Yang | H01M 2/02 |

FOREIGN PATENT DOCUMENTS

| | | |
|---|---|---|
| JP | 2010-528406 A | 8/2010 |
| JP | 4815026 B2 | 9/2011 |
| JP | 5108169 B1 | 10/2012 |
| JP | 5604018 B2 | 8/2014 |
| KR | 10-2016-0122444 A | 10/2016 |
| KR | 10-1720636 B1 | 3/2017 |

\* cited by examiner

BATTERY MODULE HAVING HEAT PIPE AND BATTERY PACK INCLUDING THE SAME

TECHNICAL FIELD

The present application claims priority to Korean Patent Application No. 10-2017-0150681 filed on Nov. 13, 2017, and Korean Patent Application No. 10-2018-0086714 filed on Jul. 25, 2018, in the Republic of Korea, the disclosures of which are incorporated herein by reference.

The present disclosure relates to a battery module having a heat pipe and a battery pack including the same, and more particularly, to a battery module having an improved heat balance for a plurality of cylindrical battery cells and a battery pack including the same.

BACKGROUND ART

Secondary batteries are highly applicable to a wide range of products and have electrical characteristics with high energy density. The secondary batteries are applied not only to portable electronic devices but also to electric vehicles, hybrid vehicles, electric power storage devices and the like, driven by electric driving sources.

Secondary batteries are attracting attention as a new energy source for improving environment-friendliness and energy efficiency in that they have not only a primary advantage of reducing the use of fossil fuels but also generate no by-product due to the use of energy.

A battery pack applied to an electric vehicle has a structure in which a plurality of battery modules, each including a plurality of battery cells, are connected to obtain a high output. In addition, each battery cell includes positive and negative electrode collectors, a separator, an active material and an electrolyte as an electrode assembly and allows repeated charging and discharging by an electrochemical reaction between the components.

Meanwhile, as the need for large-capacity structures has increased along with the utilization as energy storage sources in recent years, there has been an increasing demand for a multi-module battery pack having a plurality of battery modules, in each of which a plurality of secondary batteries are connected in series and/or in parallel.

Since the battery pack having a multi-module structure is manufactured in a manner that the plurality of secondary batteries are densely packed in a narrow space, it is important to release the heat generated from each secondary battery easily.

That is, during the process of charging or discharging the secondary battery, heat is generated due to an electrochemical reaction. Thus, if the heat of the battery module generated during the charging and discharging process is not effectively removed, heat accumulation may occur. In addition, the deterioration of the battery module may be accelerated and, in some cases, ignition or explosion may occur. Thus, in the conventional art, a cooling device for cooling a high-power large-capacity battery module and battery cells included therein is applied.

Also, in the conventional art, a high-rate discharge battery module includes a plurality of battery cells for high-rate discharge.

However, if a plurality of battery cells are loaded in one battery module, the density of the battery cells is very high due to the space limitation. Also, since the heating amount of the battery cell is proportional to the square of the current, the temperature of the battery cell is likely to rise sharply during high-rate discharge. In particular, the heat island phenomenon where the heat is concentrated in a central portion of the array structure of battery cells loaded in the battery module is likely to occur.

If the heat island phenomenon occurs in a long term, the output voltages of battery cells electrically connected in parallel are not uniform, resulting in cell imbalance, and thus it is difficult for the battery module to give its performance.

Thus, a technology capable of effectively cooling and improving a heat balance is needed in order to improve the performance and lifetime of the battery module.

DISCLOSURE

Technical Problem

The present disclosure is designed to solve the problems of the related art, and therefore the present disclosure is directed to providing a battery module which improves a heat balance of a plurality of cylindrical battery cells, and a battery pack including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of cylindrical battery cells, each having a battery can standing vertically so that electrode terminals are respectively formed at an upper portion and a lower portion thereof, the battery can having a side portion coated with an electrical insulation member, the plurality of cylindrical battery cells being arranged in a horizontal direction;

a module housing having an accommodation portion formed therein to accommodate the plurality of cylindrical battery cell; and a heat pipe having an outer wall to form a sealed tube structure, the tube structure including a coolant therein, the heat pipe including a wick located to surround an inner wall of the tube structure and having a plurality of micropores formed therein, the heat pipe extending in a horizontal direction along the plurality of cylindrical battery cells, the heat pipe having a plate shape and provided to stand so that both surfaces thereof are oriented in a horizontal direction.

Also, the heat pipe may have a curved portion with a curved shape in a horizontal direction so that both surfaces thereof are adhered to at least a portion of an outer surface of the cylindrical battery cell.

Moreover, each of both surfaces of the heat pipe in a horizontal direction may extend to face at least a portion of an outer surface of at least one cylindrical battery cell.

In addition, the plurality of cylindrical battery cells may be arranged in a plurality of rows and columns, Further, the heat pipe may be located at one horizontal side or the other horizontal side of the plurality of cylindrical battery cells arranged at a center row or a center column.

Also, the plurality of cylindrical battery cells may be arranged in a plurality of rows and columns. Further, both ends of the heat pipe in a direction extending along the plurality of cylindrical battery cells may be located to face a cylindrical battery cell located at an outer row, or an outer column, or an outer row and an outer column, among the plurality of cylindrical battery cells. In addition, a center of the heat pipe in a direction extending along the plurality of cylindrical battery cells may be located to face a cylindrical battery cell located at an inner row, or an inner column, or an inner row and an inner column, among the plurality of cylindrical battery cells.

Further, the module housing may include an upper case having a first accommodation portion with a hollow structure to surround an outer side surface of an upper portion of the cylindrical battery cell; and a lower case coupled to a lower portion of the upper case and having a second accommodation portion with a hollow structure to surround an outer side surface of a lower portion of the cylindrical battery cell.

Also, a concave groove that is partially recessed inwards may be formed at a lower portion of the first accommodation portion and an upper portion of the second accommodation portion, respectively, so that the heat pipe is inserted therethrough.

Moreover, the module housing may have a perforation hole formed so that both ends of the heat pipe in a longitudinal direction protrude out of the module housing.

In addition, radiation pins may be formed at outer surfaces of both ends of the heat pipe, which are exposed to the outside through the perforation hole of the module housing.

Moreover, the battery module may further include a tray having a loading portion provided to load the module housing on an upper surface thereof and a sidewall extending upwards along an outer wall of the module housing from an outer circumference of the loading portion.

Also, both ends of the heat pipe, or both ends of the heat pipe and at least a part of the radiation pins, may be provided to contact the sidewall of the tray.

Further, the electrode terminals of the cylindrical battery cell may include a first electrode terminal formed at an upper end of the battery can and a second electrode terminal formed at a lower end of the battery can.

In addition, the battery module may include a first current collection plate loaded at an upper portion of the module housing and electrically connected to the first electrode terminal of the cylindrical battery cell; a second current collection plate loaded at a lower portion of the module housing and electrically connected to the second electrode terminal of the cylindrical battery cell; and a heat conduction pad being electrically insulating and located at a lower surface of the second current collection plate.

Further, the heat pipe may be located at a lower surface of the heat conduction pad so that the electrically-insulating heat conduction pad is interposed between the second current collection plate and the heat pipe.

In another aspect of the present disclosure, there is also provided a battery module, comprising: a plurality of cylindrical battery cells, each having a battery can standing vertically so that electrode terminals are respectively formed at an upper portion and a lower portion thereof, the battery can having a side portion coated with an electrical insulation member, the plurality of cylindrical battery cells being arranged in a horizontal direction; a module housing having an accommodation portion formed therein to accommodate the plurality of cylindrical battery cell; and a heat pipe having an outer wall to form a sealed tube structure, the tube structure including a coolant therein, the heat pipe including a wick located to surround an inner wall of the tube structure and having a plurality of micropores formed therein, the heat pipe extending in a horizontal direction along the plurality of cylindrical battery cells, the heat pipe having a plate shape and provided to stand so that both surfaces thereof are oriented in a horizontal direction, Here, the outer wall of the heat pipe may have a polymer layer, and the polymer layer may be melted and swept away when the battery has a temperature over a predetermined level.

In another aspect of the present disclosure, there is also provided a battery pack, comprising at least one battery module according to the present disclosure.

In another aspect of the present disclosure, there is also provided a device, comprising a battery pack according to the present disclosure.

Advantageous Effects

According to an embodiment of the present disclosure, since the battery module includes a heat pipe provided to stand so that both side surfaces having a relatively larger area than the other surfaces are oriented in a horizontal direction and thus the area facing a side of the cylindrical battery cell is maximized, the heat generated from the plurality of cylindrical battery cells may be effectively conducted to the heat pipe, resulting in high cooling efficiency, and the coolant inside the heat pipe may circulate by the temperature difference of the heat storage unit and the heat dissipation unit without the need for a separate coolant circulation, thereby drastically reducing the manufacturing cost.

Also, according to an embodiment of the present disclosure, the heat pipe may increase the contact area with the outer surface of the cylindrical battery cell through a curved portion formed at the outer wall and be disposed by effectively utilizing the narrow space of the module housing.

Further, according to an embodiment of the present disclosure, since the locations of the center and both ends of the pipe are set in consideration of the position of a cylindrical battery cell exhibiting the highest temperature among the plurality of cylindrical battery cells and the position of a cylindrical battery cell exhibiting the lowest temperature during charging and discharging the battery module, it is possible to increase the cooling effect of the heat pipe, and ultimately the cylindrical battery cell at a heat accumulation region (exhibiting a heat island phenomenon) among the plurality of cylindrical battery cells may be cooled to effectively achieve the heat balance inside the battery module. Accordingly, the life characteristics and performance of the battery module may be improved.

In addition, according to an embodiment of the present disclosure, since both ends of the heat pipe are exposed to the outside of the battery module, the temperature difference between the heat storage unit and the heat dissipation unit of the heat pipe may be maximized, thereby effectively increasing the cooling efficiency.

Further, according to an embodiment of the present disclosure, since both ends of the heat pipe are in contact with the sidewall of the tray, it is possible to achieve higher cooling efficiency, compared to a structure in which both ends of the heat pipe simply contact the outside air.

In addition, according to an embodiment of the present disclosure, since the coupling protrusion of the module housing may be inserted into the guide groove and fastened and fixed thereto to guide the placement of a plurality of battery modules, other battery modules connected to one battery module may be easily disposed and also fixed so as not to be easily separated from each other.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
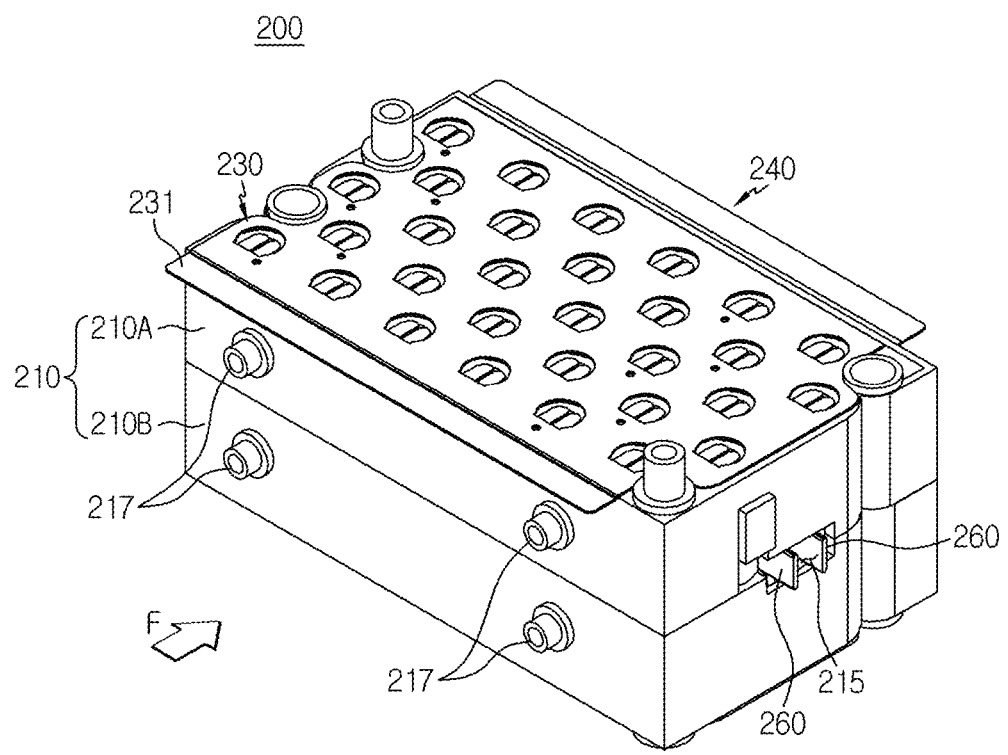
FIG. 1 is a perspective view showing a battery module according to an embodiment of the present disclosure.

FIG. 1 is a perspective view showing a battery module according to an embodiment of the present disclosure. Also, FIG. 2 is an exploded perspective view showing components of the battery module according to an embodiment of the present disclosure separately.

Figure 2:
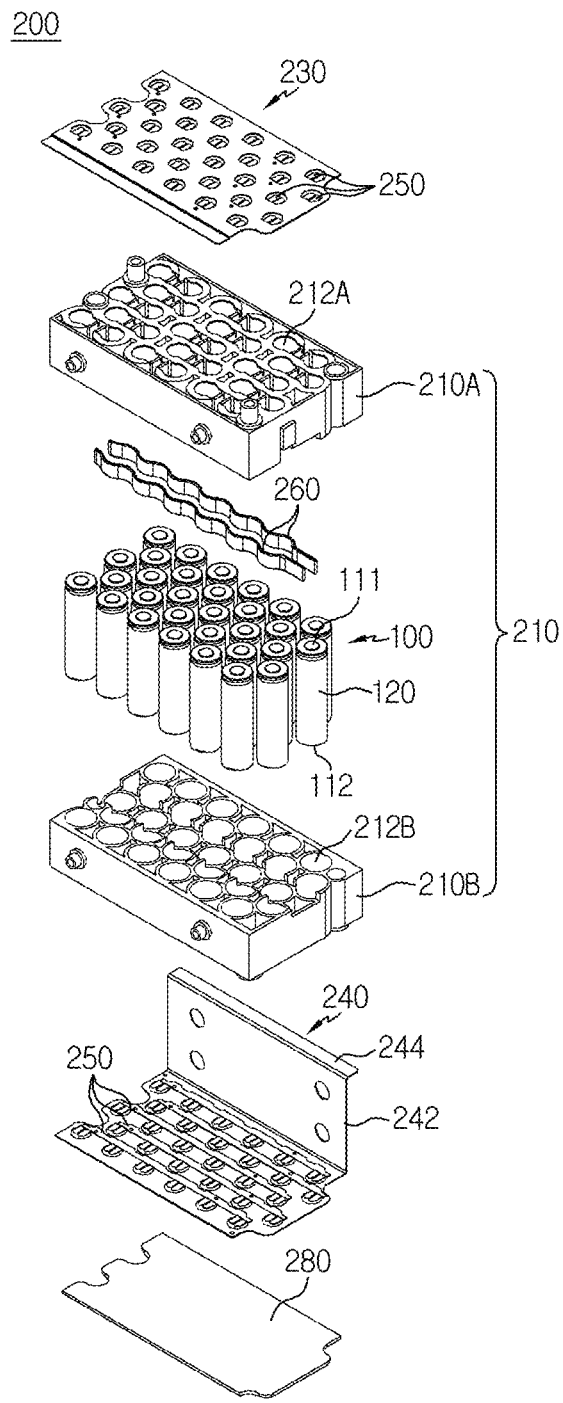
FIG. 2 is an exploded perspective view showing components of the battery module according to an embodiment of the present disclosure separately.

Referring to FIGS. 1 and 2, a battery module 200 according to an embodiment of the present disclosure may include a plurality of cylindrical battery cells 100, a module housing 210, and a heat pipe 260.

Here, the cylindrical battery cell 100 may include a cylindrical battery can 120, and an electrode assembly (not shown) accommodated in the battery can 120.

Here, the battery can 120 may be configured to stand vertically. Also, the battery can 120 includes a material with high electrical conductivity, and, for example, the battery can 120 may include aluminum or copper.

In addition, electrode terminals 111, 112 may be formed at upper and lower portions of the battery can 120, respectively. Specifically, a first electrode terminal 111 may be formed at the upper surface of the battery can 120, which has a flat circular shape, and a second electrode terminal 112 may be formed at the lower surface of the battery can 120, which has a flat circular shape.

Also, an electrical insulation member may be coated on a side of the battery can 120. That is, since the battery can 120 is electrically connected to an electrode of the electrode assembly therein, the battery can 120 may be coated with, for example, an insulating film to surround the side of the battery can 120 in order to prevent an unintended conductive object from contacting the battery can 120 and thus causing an electric leakage.

In addition, the electrode assembly (not shown) may have a jelly-roll type structure where the electrode assembly is rolled with a separator being interposed between a positive electrode and a negative electrode. A positive electrode tab may be attached to the positive electrode (not shown) and connected to the first electrode terminal 111 at the upper end of the battery can 120. A negative electrode tab may be attached to the negative electrode (not shown) and connected to the second electrode terminal 112 at the lower end of the battery can 120.

Further, when viewed in the F direction, the plurality of cylindrical battery cells 100 may be arranged in a horizontal direction in a state of standing vertically inside the module housing 210.

Here, the terms indicating directions such as front, rear, left, right, upper and lower may be varied depending on the position of an observer or the shape of an object. For the convenience of explanation, in the present specification, the directions such as front, rear, left, right, upper and lower are defined based on the view in the F direction.

Here, the module housing 210 may include accommodation portions 212A, 212B to accommodate the plurality of cylindrical battery cells 100 therein. Specifically, the accommodation portions 212A, 212B may have a plurality of hollow structures formed to surround the outer side surface of the cylindrical battery cells 100.

Figure 3:
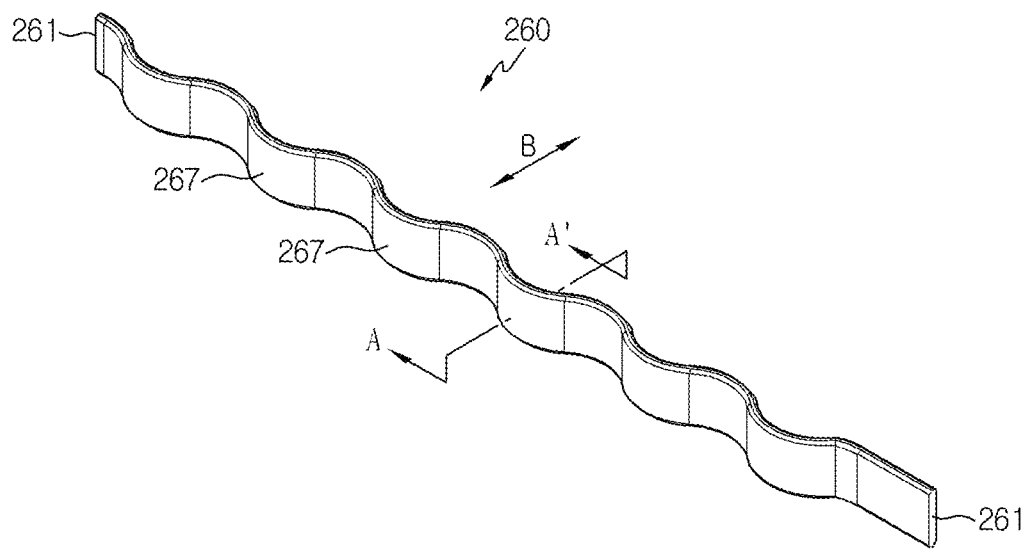
FIG. 3 is a perspective view showing some components of the battery module according to an embodiment of the present disclosure.

FIG. 3 is a perspective view showing some components of the battery module according to an embodiment of the present disclosure. Also, FIG. 4 is a cross-sectioned view showing a section of a heat pipe, taken along the line A-A' of FIG. 3.

Figure 4:
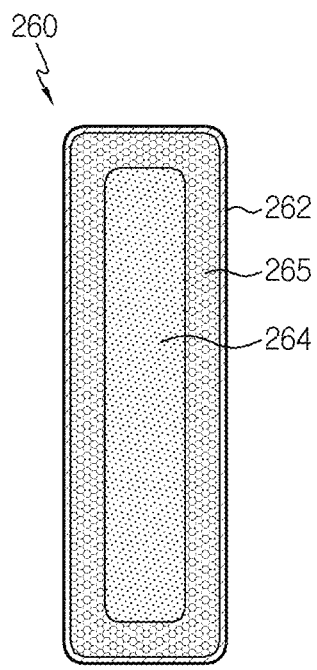
FIG. 4 is a cross-sectioned view showing a section of a heat pipe, taken along the line A-A' of FIG. 3.

Referring to FIGS. 3 and 4, the heat pipe 260 has a concept identical or similar to a general heat pipe 260, and includes a heat storage unit in which a coolant 264 is vaporized by absorbing heat generated at the cylindrical battery cell 100 and a heat dissipation unit in which the coolant 264 vaporized in the heat storage unit is liquefied by releasing heat to the outside. For example, the heat pipe 260 of the present disclosure may be configured so that a center thereof extending along the plurality of cylindrical battery cells 100 serves as the heat storage unit and both ends of the heat pipe 260 serve as the heat dissipation unit.

Also, the heat pipe 260 may include an outer wall 262 having a sealed tube structure formed therein. In addition, the outer wall 262 may have a material with high thermal conductivity. For example, the material with high thermal conductivity may be aluminum or copper.

Moreover, a cooling pin may be formed at the outer wall 262 to increase the contact area with the cylindrical battery cell 100. For example, the cooling pin may be a plurality of pins extending upwards along the outer surface of the cylindrical battery cell 100 at the outer wall 262 of the heat pipe 260.

In addition, the coolant 264 may be included inside the tube structure. For example, the coolant 264 may be water, Freon-based coolant, ammonia, acetone, methanol, ethanol, naphthalene, sulfur, mercury or the like.

Further, the heat pipe 260 may include a wick 265 having a plurality of micropores formed therein. In addition, the wick 265 may be positioned to surround the inner wall of the tube structure. Further, the wick 265 may be configured to have the coolant 264 therein in a vacuum state.

Also, the heat pipe 260 may extend in a horizontal direction along the plurality of cylindrical battery cells 100. That is, the heat pipe 260 may have a tube structure extending in one direction and may extend to face the sides of the plurality of cylindrical battery cells 100 arranged in the horizontal direction.

In addition, the heat pipe 260 may be formed in a plate shape. Specifically, the plate shape may have both side surfaces in a horizontal direction B with a relatively larger area than the other surfaces and upper and lower surfaces having a relatively smaller area than both side surfaces. For example, as shown in FIG. 3, two heat pipes 260 may be configured to stand so that both side surfaces are oriented in the horizontal direction B.

Thus, according to this configuration of the present disclosure, since the heat pipe 260 is configured such that both side surfaces having a relatively larger area than the other surfaces stand to face the horizontal direction and thus the area facing the side of the cylindrical battery cell 100 is maximized, the heat generated at the cylindrical battery cell 100 may be effectively conducted to the heat pipe 260, thereby ensuring high cooling efficiency. Also, since the coolant inside the heat pipe 260 may circulate due to the temperature difference between the heat storage unit and the heat dissipation unit without a separate coolant circulation device, the manufacturing cost may be drastically reduced.

Figure 5:
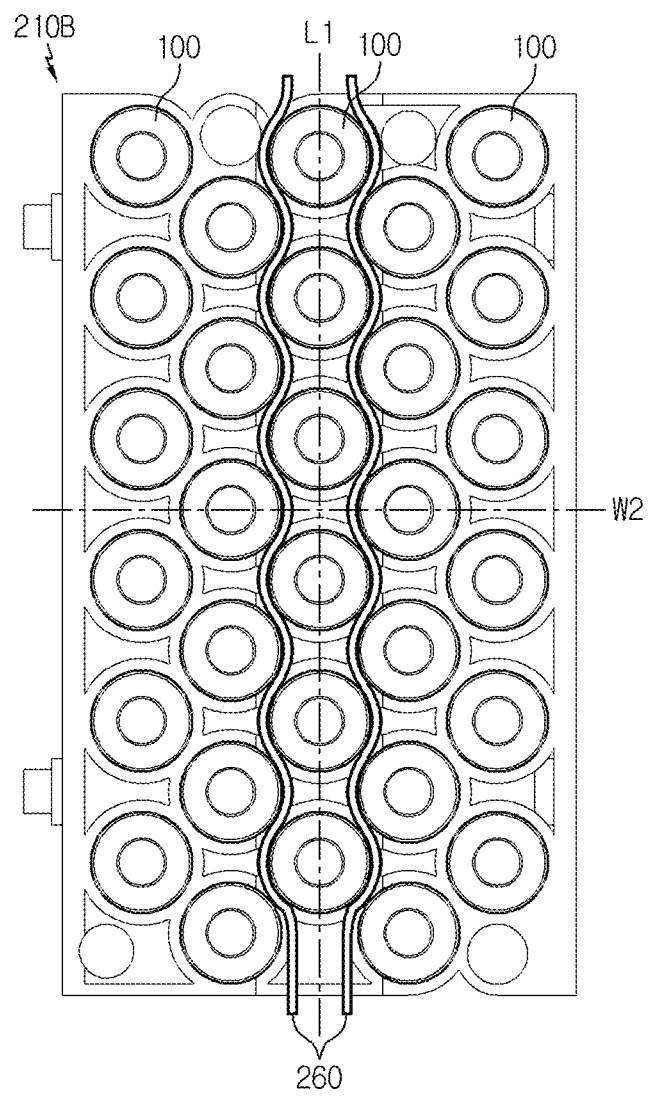
FIG. 5 is a plane view showing some components of the battery module according to an embodiment of the present disclosure.

FIG. 5 is a plane view showing some components of the battery module according to an embodiment of the present disclosure.

Referring to FIG. 5 along with FIGS. 2 and 3, the heat pipe 260 may be configured such that both side surfaces thereof are adhered to at least a portion of the outer surface of the plurality of cylindrical battery cells 100. For example, a curved portion 267 may be formed at a portion of the heat pipe 260 so as to correspond to a rounded outer surface of the cylindrical battery cell 100.

Also, since the battery can 120 of the cylindrical battery cell 100 is configured to stand vertically, the curved portion 267 with a curved shape in a horizontal direction B may be formed at the heat pipe 260. Moreover, the heat pipe 260 may have a plurality of curved portions 267 to contact the outer surfaces of the plurality of cylindrical battery cells 100, respectively. For example, as shown in FIG. 3, the curved portions 267 may be formed such that both side surfaces of each of two heat pipes 260 are in contact with a portion of the outer surfaces of twelve cylindrical battery cells 100.

In other words, when the heat pipe 260 is configured to extend flat without a curved portion, the contact area of the cylindrical battery cell 100 may not be maximized, and so it is difficult to increase the heat radiation effect.

Thus, according to this configuration of the present disclosure, the contact area between the heat pipe 260 and the outer surface of the cylindrical battery cell 100 may be effectively increased by means of the curved portion 267, and the heat pipe 260 may be disposed by effectively utilizing the narrow space of the module housing 210.

Further, the plurality of cylindrical battery cells 100 may be arranged in a plurality of rows and columns inside the accommodation portions 212A, 212B of the module housing 210. Also, the heat pipe 260 may be disposed between rows or columns of the cylindrical battery cells 100. That is, each of both side surfaces of the heat pipe 260 in the horizontal direction B may be provided to face at least a portion of the outer surface of at least one cylindrical battery cell 100.

More specifically, the heat pipe 260 may be located at one horizontal side or the other horizontal side of the plurality of cylindrical battery cells 100 arranged in a center row L1 or a center column W2. In other words, the heat pipe 260 may be formed to extend in contact with at least a portion of the plurality of cylindrical battery cells 100 arranged in the center row L1 or the center column W2.

For example, as shown in FIG. 5, two heat pipes 260 may be positioned at one side and the other side of the plurality of cylindrical battery cells 100 located in the center row L1. In addition, two heat pipes 260 may extend to contact the plurality of cylindrical battery cells 100 located in the center row L1 and a portion of the plurality of cylindrical battery cells 100 in another row adjacent to the center row L1.

Figure 6:
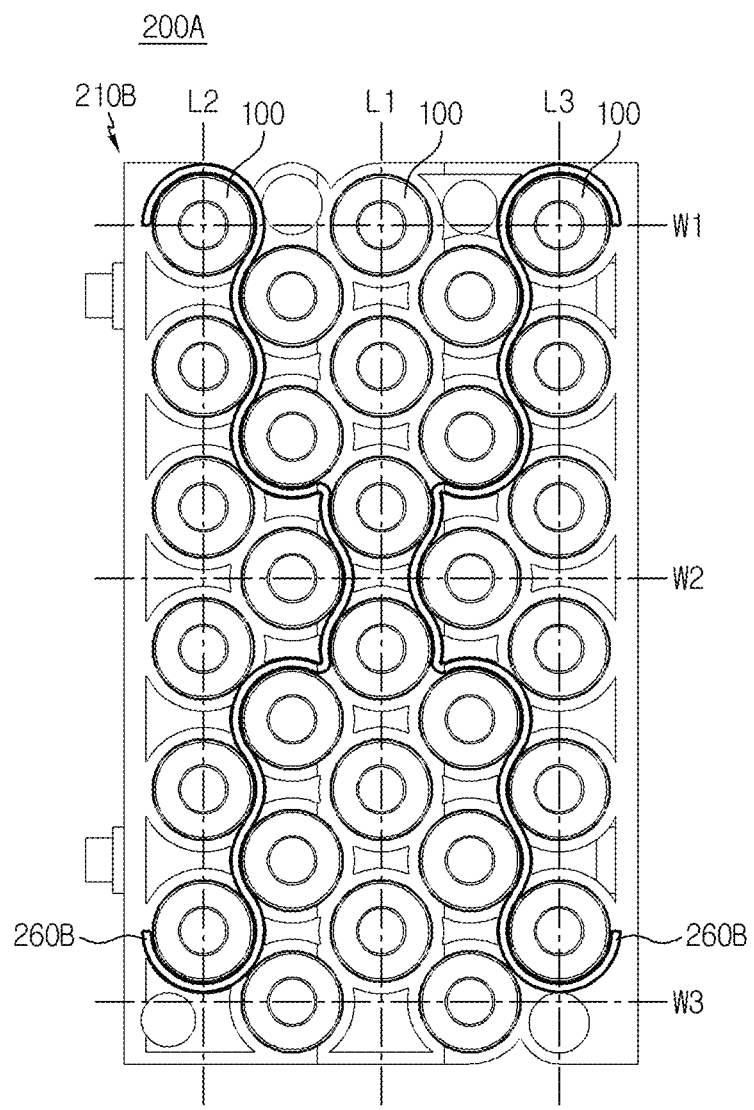
FIG. 6 is a plane view showing some components of the battery module according to another embodiment of the present disclosure.

FIG. 6 is a plane view showing some components of the battery module according to another embodiment of the present disclosure.

Referring to FIG. 6 along with FIG. 2, in a battery module 200A according to another embodiment of the present disclosure, the plurality of cylindrical battery cells 100 may form an array according to a predetermined arrangement and be accommodated in the accommodation portions 212A, 212B of the module housing 210.

At this time, the center of the heat pipe 260B in a direction extending along the plurality of cylindrical battery cells 100 may be disposed to contact a cylindrical battery cell 100 with the highest temperature among the plurality of the cylindrical battery cells 100 when the battery module 200 is charged and discharged. For example, the center of the heat pipe 260B may be configured to contact a cylindrical battery cell 100 located at the center of the array of the plurality of cylindrical battery cells 100.

Also, both ends of the heat pipe 260B in the extending direction may be disposed in contact with a cylindrical battery cell 100 with the lowest temperature among the plurality of the cylindrical battery cells 100. For example, both ends of the heat pipe 260B in the extending direction may be configured to contact a cylindrical battery cell 100 located at an outer side of the array of the plurality of cylindrical battery cells 100.

More specifically, when the plurality of cylindrical battery cells 100 are arranged in a plurality of rows and columns in the accommodation portions 212A, 212B of the module housing 210, both ends of the heat pipe 260B in the extending direction along the plurality of cylindrical battery cells 100 may be positioned to face cylindrical battery cells 100 located at outer rows L2, L3 among the plurality of cylindrical battery cells 100.

That is, since the cylindrical battery cells 100 located at the outer rows L2, L3 are closer to the outside than the cylindrical battery cells 100 located at the inner row L1, it is likely to have a low temperature when the battery module 200 is charged and discharged. Thus, it is appropriate that both ends of the heat pipe 260B are positioned to face the cylindrical battery cells 100 located in the outer rows L2, L3.

On the contrary, the center of the heat pipe 260B in a direction extending along the plurality of cylindrical battery cells 100 may be positioned to face the cylindrical battery cell 100 located in the inner row L1 among the plurality of cylindrical battery cells 100.

Moreover, both ends of the heat pipe 260B extending in a direction extending along the plurality of cylindrical battery cells 100 may be positioned to face the cylindrical battery cells 100 located in outer columns W1, W3 among the plurality of cylindrical battery cells 100.

That is, since the cylindrical battery cells 100 located in the outer columns W1, W3 are likely to have a low temperature when the battery module 200 is charged and discharged, compared to the cylindrical battery cell 100 located in the inner column W2, both ends of the heat pipe 260B according to the present disclosure may be positioned to face the cylindrical battery cells 100 located in the outer columns W1, W3.

On the contrary, the center of the heat pipe 260B in a direction extending along the plurality of cylindrical battery cells 100 may be positioned to face the cylindrical battery cell 100 located in the inner column W2 among the plurality of cylindrical battery cells 100.

In addition, both ends of the heat pipe 260B in a direction extending along the plurality of cylindrical battery cells 100 may be located to face the cylindrical battery cells 100 located in the outer rows L2, L3 and the outer columns W1, W3 among the plurality of cylindrical battery cells 100.

That is, since the cylindrical battery cells 100 located in the outer rows L2, L3 and the outer columns W1, W3 are positioned at an outer side in comparison to the cylindrical battery cells 100 located in the inner row L1 and the inner column W2 and thus are likely to have a low temperature, both ends of the heat pipe 260B according to the present disclosure may be positioned to face the cylindrical battery cells 100 located in the outer rows L2, L3 and the outer columns W1, W3.

On the contrary, the center of the heat pipe 260B in a direction extending along the plurality of cylindrical battery cells 100 may be positioned to face the cylindrical battery cells 100 located in the inner row L1 and the inner column W2 among the plurality of cylindrical battery cells 100.

For example, as shown in FIG. 6, both ends of two heat pipes 260B may be positioned to face the cylindrical battery cells 100 located in the outer rows L2, L3 and the outer columns W1, W3. On the contrary, the center of the heat pipe 260B may be positioned to face the cylindrical battery cells 100 located in the inner row L1 and the inner column W2.

Thus, according to this configuration of the present disclosure, by setting the positions of the center and both ends of the heat pipe 260B in consideration of the positions of the position of the cylindrical battery cell 100 exhibiting the highest temperature and the cylindrical battery cell 100 exhibiting the lowest temperature among the plurality of cylindrical battery cells 100 when the battery module 200 is charged or discharged, it is possible to enhance the cooling effect of the heat pipe 260B. Moreover, since the cylindrical battery cells 100 in a region having a large heat accumulation among the plurality of cylindrical battery cells 100 are cooled, it is ultimately possible to effectively achieve the thermal balance in the battery module 200.

Figure 7:
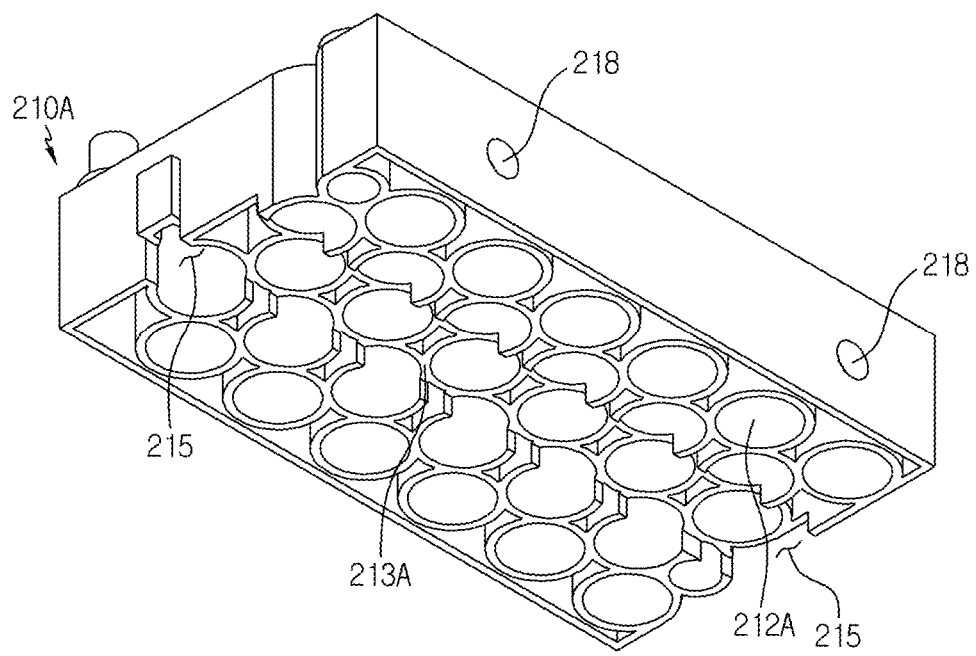
FIG. 7 is a perspective view showing an upper case that is a component of the battery module according to an embodiment of the present disclosure.

FIG. 7 is a perspective view showing an upper case that is a component of the battery module according to an embodiment of the present disclosure. Also, FIG. 8 is a perspective view showing a lower case that is a component of the battery module according to an embodiment of the present disclosure.

Figure 8:
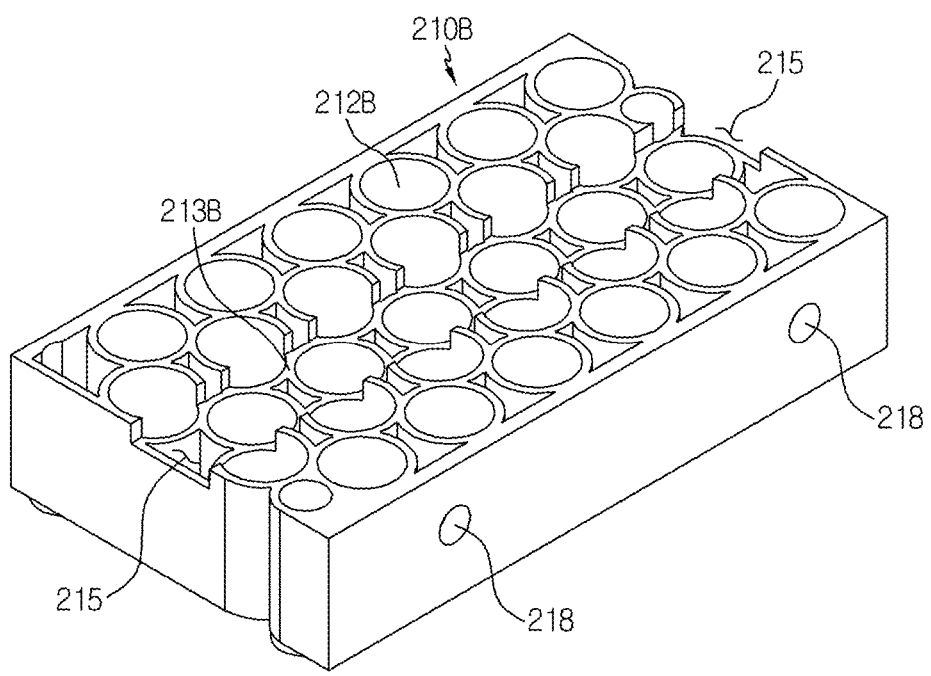
FIG. 8 is a perspective view showing a lower case that is a component of the battery module according to an embodiment of the present disclosure.

Referring to FIGS. 7 and 8, the module housing 210 may include an upper case 210A and a lower case 210B.

Here, the upper case 210A may include a first accommodation portion 212A formed with a hollow structure to surround an outer side surface of an upper portion of the cylindrical battery cell 100.

Also, the lower case 210B may include a second accommodation portion 212B coupled to a lower portion of the upper case 210A and formed with a hollow structure to surround an outer side surface of a lower portion of the cylindrical battery cell 100.

At this time, in order to allow the heat pipe 260 to be included in the module housing 210, a concave groove 213 having an inwardly recessed portion may be formed the lower portion of the first accommodation portion 212A and the upper portion of the second accommodation portion 212B so that the heat pipe 260 may be inserted therethrough.

Specifically, a concave groove 213A that is relatively recessed further in an upper direction in comparison to the other lower surface portion may be formed on the lower surface of the first accommodation portion 212A formed inside the upper case 210A. Also, the concave groove 213A may extend from one side of the upper case 210A to the other side thereof.

In addition, a concave groove 213B that is relatively recessed further in a lower direction in comparison to the other upper surface portion may be formed at the upper surface of the second accommodation portion 212B formed inside the lower case 210B. Also, the concave groove 213 may extend from one side of the lower case 210B to the other side thereof.

Further, the concave groove 213A of the first accommodation portion 212A and the concave groove 213B of the second accommodation portion 212B may be coupled to each other so that the heat pipe 260 may be inserted through the inside thereof. In other words, when the lower case 210B is fastened to the lower portion of the upper case 210A, the concave groove 213A of the first accommodation portion 212A and the concave groove 213B of the second accommodation portion 212B may be coupled with each other.

Referring to FIGS. 7 and 8 again along with FIG. 1, a perforation hole 215 may be formed at the module housing 210 such that both ends of the heat pipe 260 in the longitudinal direction protrude to the outside of the module housing 210.

Specifically, one longitudinal end of the heat pipe 260 accommodated in the module housing 210 may be located at an outer wall at one side of the module housing 210 to protrude outward, and the other longitudinal end of the heat pipe 260 accommodated in the module housing 210 may be located at an outer wall at the other side of the module housing 210 to protrude outward.

For example, as shown in FIGS. 1 and 5, the perforation holes 215 may be formed in the outer walls at one side and the other side of the module housing 210, and both ends of two heat pipes 260 may be inserted into the perforation holes 215 to protrude to the outside of the module housing 210.

Thus, according to this configuration of the present disclosure, since both ends of the heat pipe 260 are exposed to the outside of the battery module 200, both ends of the heat pipe 260 may function as a heat dissipation unit for dissipating heat to the outside for liquefaction. Further, the heat pipe 260 may ensure smooth circulation of the coolant 264 therein and effectively increase the cooling efficiency as the temperature difference between the heat storage unit and the heat dissipation unit is greater.

Figure 9:
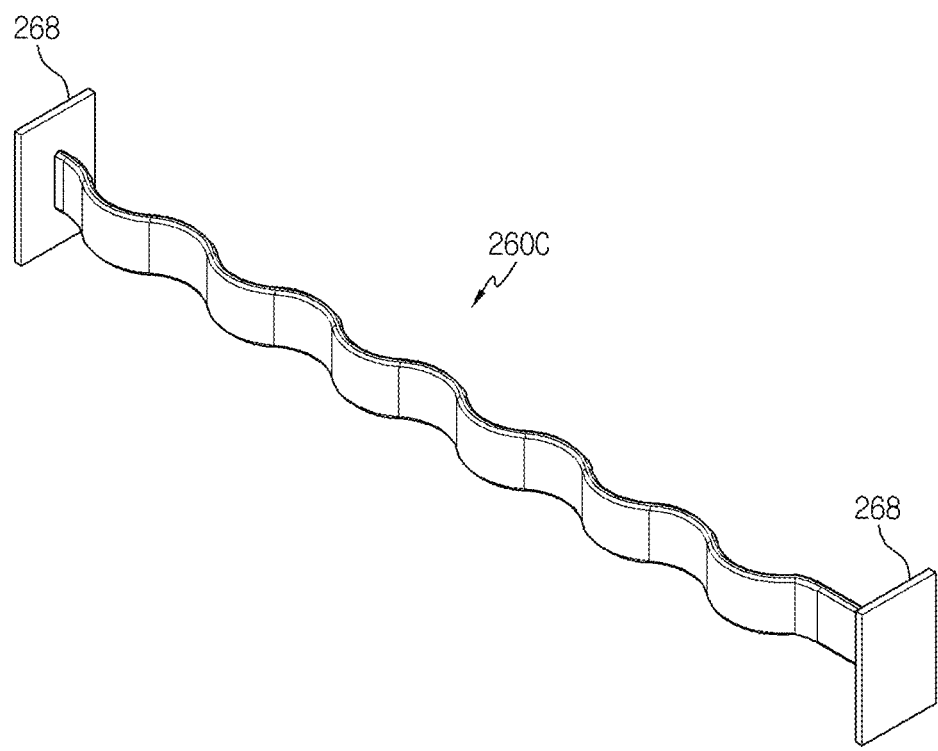
FIG. 9 is a perspective view showing a heat pipe that is a component of the battery module according to another embodiment of the present disclosure.

FIG. 9 is a perspective view showing a heat pipe that is a component of the battery module according to another embodiment of the present disclosure.

Referring to FIG. 9 along with FIG. 4, the heat pipe 260C may have a radiation pin 268 at the outer wall 262. Specifically, the heat pipe 260C may have the radiation pin 268 to increase the contact area with the outer surface of the cylindrical battery cell 100 or to dissipate heat accumulated inside the battery module 200 to the outside more effectively.

Also, the radiation pin 268 may be formed at the outer surfaces of both ends of the heat pipe 260C exposed to the outside through the perforation hole 215 of the module housing 210.

In detail, a plate-shaped radiation pin 268 extending in the vertical direction may be formed at one end of the heat pipe 260C exposed to the outside through the perforation hole 215 of the module housing 210. In addition, a plate-shaped radiation pin 268 extending in the vertical direction may be formed at the other end of the heat pipe 260C.

However, the radiation pin 268 is not limited to the plate shape but may have various shapes such as a needle shape and a wave shape.

Thus, according to this configuration of the present disclosure, as the radiation pin 268 is formed at the heat pipe 260C, it is possible to help circulation of the coolant 264 in the heat pipe 260C and effectively dissipate the internal heat to the outside, thereby reducing the temperature deviation more effectively.

Figure 10:
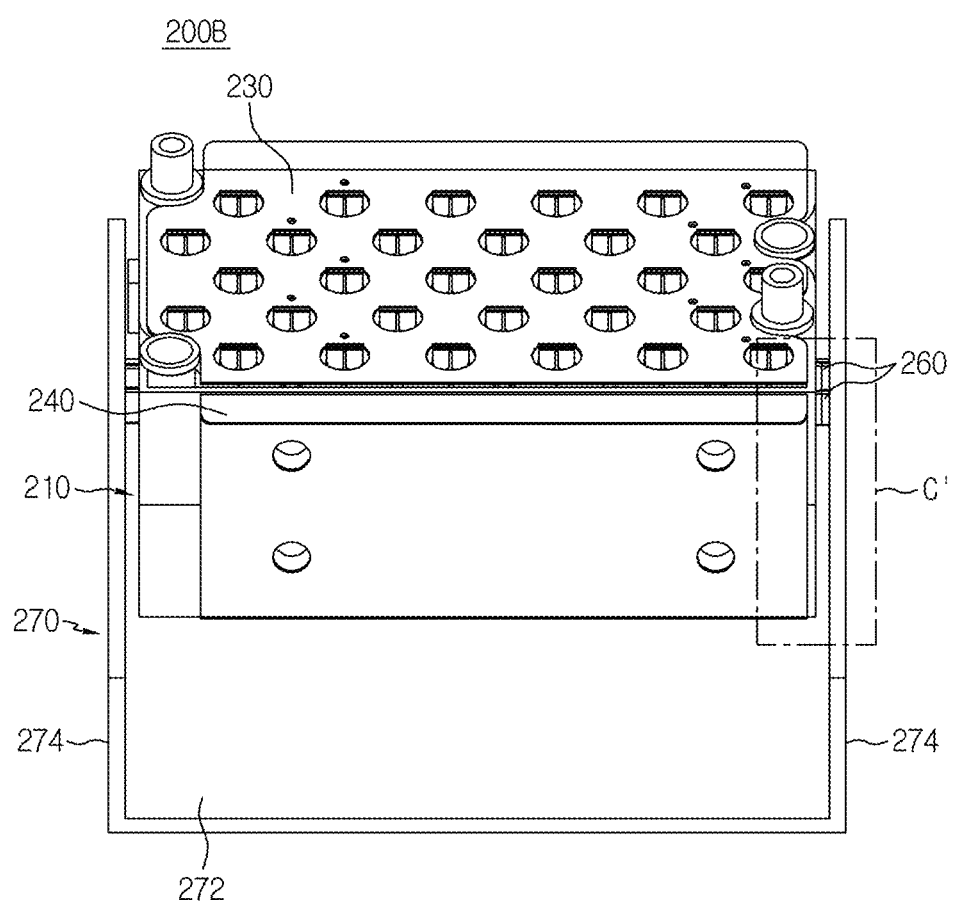
FIG. 10 is a perspective view showing a battery module according to another embodiment of the present disclosure.

FIG. 10 is a perspective view showing a battery module according to another embodiment of the present disclosure. Also, FIG. 11 is a partial front view schematically showing some components of the battery module in a region C' of FIG. 10.

Figure 11:
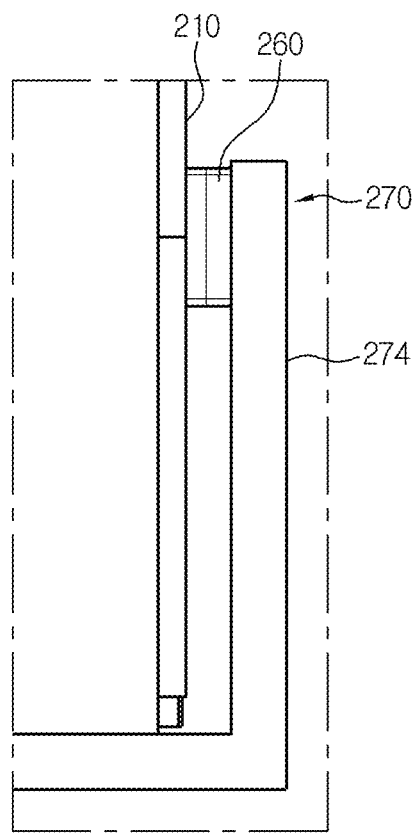
FIG. 11 is a partial front view schematically showing some components of the battery module in a region C' of FIG. 10.

Referring to FIGS. 10 and 11, the battery module 200B may further include a tray 270, compared to the battery module 200A of FIG. 1.

Here, the tray 270 may include a loading portion 272 configured to load the module housing 210 on an upper surface thereof. Specifically, the loading portion 272 may have a plate shape with relatively wide upper and lower surfaces, compared to side surfaces thereof. Also, the loading tray 272 of the tray 270 may extend in one direction so that a plurality of module housings 210 are loaded on the upper surface thereof.

In addition, the tray 270 may have a sidewall 274 extending upwardly along the outer wall 262 of the module housing 210 from the outer circumference of the loading portion 272. Specifically, the sidewall 274 may be configured to face the outer wall of the module housing 210.

Also, the tray 270 may include a material having high thermal conductivity, and the material having high thermal conductivity may be, for example, a metal such as copper or aluminum.

More specifically, in the heat pipe 260, at least a portion of both ends of the heat pipe 260 exposed to the outside through the perforation hole 215 of the module housing 210 may extend to contact the sidewall 274 of the tray 270. For example, as shown in FIG. 11, one end surface of the heat pipe 260 in a direction extending along the plurality of cylindrical battery cells 100 may contact the inner surface of the sidewall 274 of the tray 270.

Thus, according to this configuration of the present disclosure, as compared to a structure in which both ends of the heat pipe 260 merely contact the outside air to discharge the heat to the outside, it is possible to achieve higher cooling efficiency since both ends of the heat pipe 260 are in contact with the sidewall 274 of the tray 270.

Further, both ends of the heat pipe 260 exposed to the outside through the perforation hole 215 of the module housing 210 and at least a part of the radiation pins 268 formed at both ends of the heat pipe 260C of FIG. 9 may extend to contact the sidewall 274 of the tray 270.

Thus, according to this configuration of the present disclosure, compared to the configuration in which both ends of the heat pipe 260 are in contact with the sidewall 274 of the tray 270, it is possible to achieve higher cooling efficiency since both ends of the heat pipe 260 and the radiation pins 268 are in contact with the sidewall 274 of the tray 270.

Referring to FIG. 2 again, the battery module 200 may include a bus bar 250, a first current collection plate 230 and a second current collection plate 240.

Specifically, the bus bar 250 may have a structure in which one surface of the bus bar 250 is electrically connected to the electrode terminals 111, 112 of at least two cylindrical battery cells 100 among the plurality of the cylindrical battery cells 100.

In addition, the bus bar 250 may have an electrically conductive material, for example, a nickel material. For example, as shown in FIG. 2, five bus bars 250 may be provided to electrically connect the first electrode terminals 111 of thirty cylindrical battery cells 100 in parallel in one direction. Likewise, five bus bars 250 may be provided to electrically connect the second electrode terminals 112 of thirty cylindrical battery cells 100 in parallel in one direction.

Also, the first current collection plate 230 may have an electrically conductive material, and the electrically conductive material may be, for example, copper or aluminum.

Further, the first current collection plate 230 may be loaded on the upper portion of the module housing 210 and electrically connected to the first electrode terminal 111 of the cylindrical battery cell 100.

Also, at least a portion of one surface of the first current collection plate 230 may be in contact with the other surface of the bus bar 250 electrically connected to the first electrode terminal 111 of the cylindrical battery cell 100 so as to be electrically connected to the cylindrical battery cell 100.

In other words, the first current collection plate 230 may be loaded on the upper portion of the module housing 210 and electrically connected to the first electrode terminal 111 of the cylindrical battery cell 100. At this time, one surface of the first current collection plate 230 and the other surface of the bus bar 250 may be coupled to each other by laser welding.

Moreover, the second current collection plate 240 may have an electrically conductive material, and the electrically conductive material may be, for example, copper or aluminum.

In addition, the second current collection plate 240 may be loaded on the lower portion of the module housing 210 and electrically connected to the second electrode terminal 112 of the cylindrical battery cell 100.

Further, at least a portion of one surface of the second current collection plate 240 may be in contact with the other surface of the bus bar 250 electrically connected to the second electrode terminal 112 of the cylindrical battery cell 100 so as to be electrically connected to the cylindrical battery cell 100.

In other words, the second current collection plate 240 may be loaded on the lower portion of the module housing 210 and electrically connected to the second electrode terminal 112 of the cylindrical battery cell 100. At this time, one surface of the second current collection plate 240 and the other surface of the bus bar 250 may be coupled to each other by laser welding.

Figure 12:
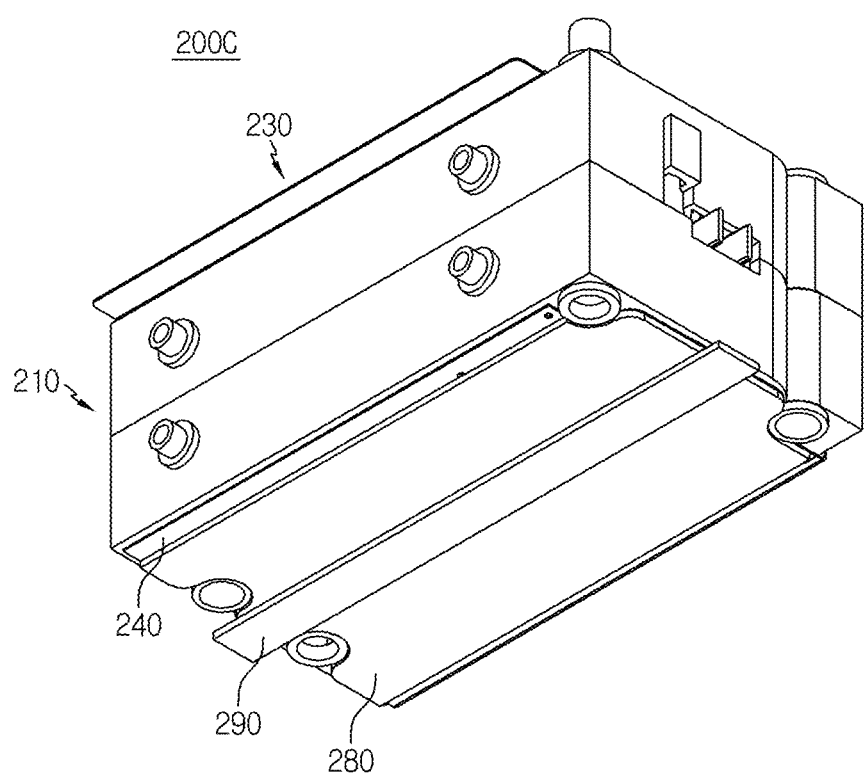
FIG. 12 is a perspective view schematically showing a battery module according to still another embodiment of the present disclosure.

FIG. 12 is a perspective view schematically showing a battery module according to still another embodiment of the present disclosure.

Referring to FIG. 12, the battery module 200C may further include a heat conduction pad 280 that is electrically insulating.

Specifically, the heat conduction pad 280 may be located at the upper surface of the first current collection plate 230 or the lower surface of the second current collection plate 240.

Also, the heat conduction pad 280 may be positioned to cool the center of the outer surface of the second current collection plate 240 in a lateral direction. That is, the heat conduction pad 280 may be located at the center of the second current collection plate 240 in the lateral direction.

In addition, the heat conduction pad 280 may extend from one side of the second current collection plate 240 to the other side thereof in the horizontal direction. For example, as shown in FIG. 12, the heat conduction pad 280 may be located at the lower surface of the second current collection plate 240.

Further, if the tray 270 is disposed at the lower surface of the heat conduction pad 280, the cooling effect may be further enhanced as compared with the case where the heat conduction pad 280 is disposed at the upper surface of the first current collection plate 230.

Thus, according to this configuration of the present disclosure, since the heat conduction pad 280 is positioned at the upper surface of the first current collection plate 230 or the lower surface of the second current collection plate 240, it is possible to effectively dissipate the heat generated at the contact portion between the electrode terminals 111, 112 of the cylindrical battery cell 100 arranged at the center of the battery module 200C and the bus bar 250.

Also, the battery module 200 may further includes a heat pipe 290 located at the other surface of the heat conduction pad 280 so that the electrically conductive heat conduction pad 280 is interposed between the first current collection plate 230 and the heat pipe 260 or between the second current collection plate 240 and the heat pipe 260. For example, as shown in FIG. 12, the battery module 200C of the present disclosure may further include the heat pipe 290 located at the lower surface of the heat conduction pad 280.

Thus, according to this configuration of the present disclosure, since the battery module 200C includes the heat pipe 260 configured to contact one surface of the heat conduction pad 280, it is possible to enhance the cooling efficiency of the cylindrical battery cell 100 located at the center among the plurality of cylindrical battery cells 100.

Further, since the heat pipe 290 located at the lower surface of the heat conduction pad 280 may contact the tray 270 located at the lower portion of the module housing 210, the cooling effect may be enhanced further, compared to the case in which the heat pipe 260 is located at the upper surface of the first current collection plate 230.

Figure 13:
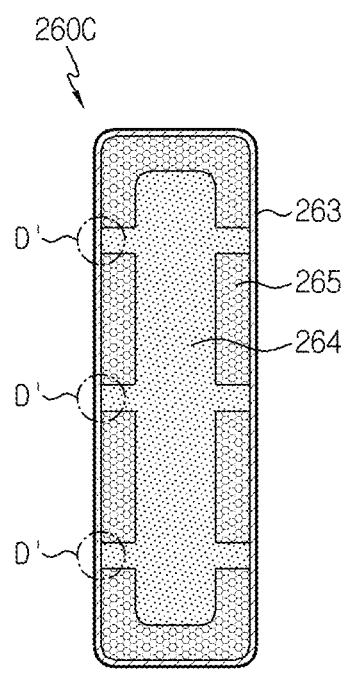
FIG. 13 is a cross-sectioned view showing a section of a heat pipe that is a component of the battery module according to still another embodiment of the present disclosure.

FIG. 13 is a cross-sectioned view showing a section of a heat pipe that is a component of the battery module according to still another embodiment of the present disclosure.

Referring to FIG. 13, the outer wall of the heat pipe 260C according to another embodiment of the present disclosure may include a polymer layer 263. Specifically, the polymer layer 263 may be configured to be melted and swept away when the battery has a temperature over a predetermined level.

Also, at least a portion D' of the inner surface of the outer wall 262 may have a region where the wick 265 is not formed, so that the coolant 264 of the heat pipe 260C may be in direct contact with the outer wall 262.

That is, if the battery module 200 operates abnormally and thus the internal temperature of the battery module 200 exceeds the normal range, the polymer layer 263, which is the outer wall 262 of the heat pipe 260C, may be melted and swept away so that the coolant 264 included in the heat pipe 260 may leak out of the outer wall 262.

Also, the coolant 264 leaked as above may directly contact the outer surface of the plurality of cylindrical battery cells 100 to cool the cylindrical battery cells 100 more quickly. Accordingly, it is possible to effectively prevent fire or explosion caused by overheating of the battery module 200.

Figure 14:
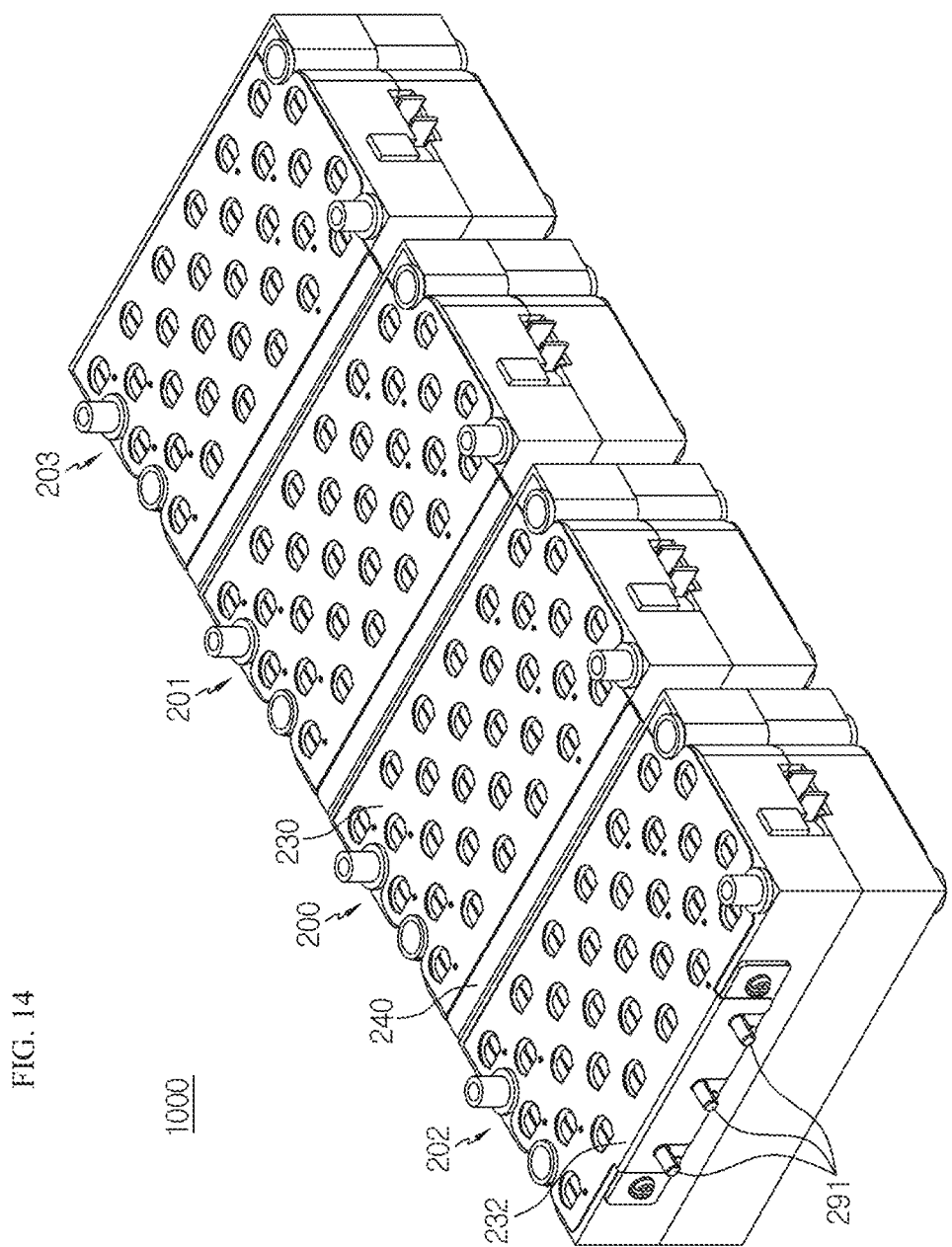
FIG. 14 is a perspective view schematically showing a battery pack according to an embodiment of the present disclosure.

FIG. 14 is a perspective view schematically showing a battery pack according to an embodiment of the present disclosure.

Referring to FIG. 14 along with FIGS. 1 and 2, the battery pack 1000 may include at least one battery module 200. In addition, one battery module 200 may be electrically connected to a battery module 202 adjacent thereto in a front direction and a battery module 201 adjacent thereto in a rear direction. For example, the plurality of battery modules 200, 201, 202, 203 of the battery pack 1000 may be electrically connected in series with each other through the contact between the first current collection plate 230 and the second current collection plate 240.

Specifically, the first current collection plate 230 of the battery module 200 may be configured to contact the upper surface of the bus bar 250 in contact with the first electrode terminal 111 of the cylindrical battery cell 100.

In addition, a connection portion 231 protruding in a front direction may be formed at one side of the first current collection plate 230 so as to be in contact with at least a portion of the second current collection plate 240.

Moreover, the second current collection plate 240 may be formed to contact the lower surface of the bus bar 250 in contact with the second electrode terminals 112 of the plurality of cylindrical battery cells 100.

Further, the second current collection plate 240 may have a vertically bent and extending structure 242 that is vertically bent and extends upwards from one side of the plate in contact with the lower surface of the bus bar 250.

In addition, the second current collection plate 240 may have a horizontally bent and extending structure 244 that is horizontally bent and extends rearwards from the upper end of the vertically bent and extending structure 242 so as to be electrically connected to the connection portion 231 of the first current collection plate 230.

Referring to FIG. 14 along with FIGS. 1, 7 and 8, a coupling protrusion 217 and a guide groove 218 may be formed at the outer wall of the module housing 210 to guide the arranged position of another battery module 200.

Specifically, a plurality of coupling protrusions 217 may be formed at one outer wall of the module housing 210, and a plurality of guide grooves 218 may be formed at the outer wall 262 of the module housing 210 so that a plurality of coupling protrusions 217 formed at another battery module 201 may be inserted therein.

Further, the battery module 200 located at the front of the battery pack 1000 among the plurality of battery modules 200, 201, 202, 203 may have an external input/output terminal 291.

Thus, according to this configuration of the present disclosure, the coupling protrusion 217 of the module housing 210 according to the present disclosure may be inserted into the guide groove 218 of another battery module to guide the placement of a plurality of battery modules. Thus, the plurality of battery modules may be easily arranged and also be fixed so as not to be easily separated from each other.

Figure 15:
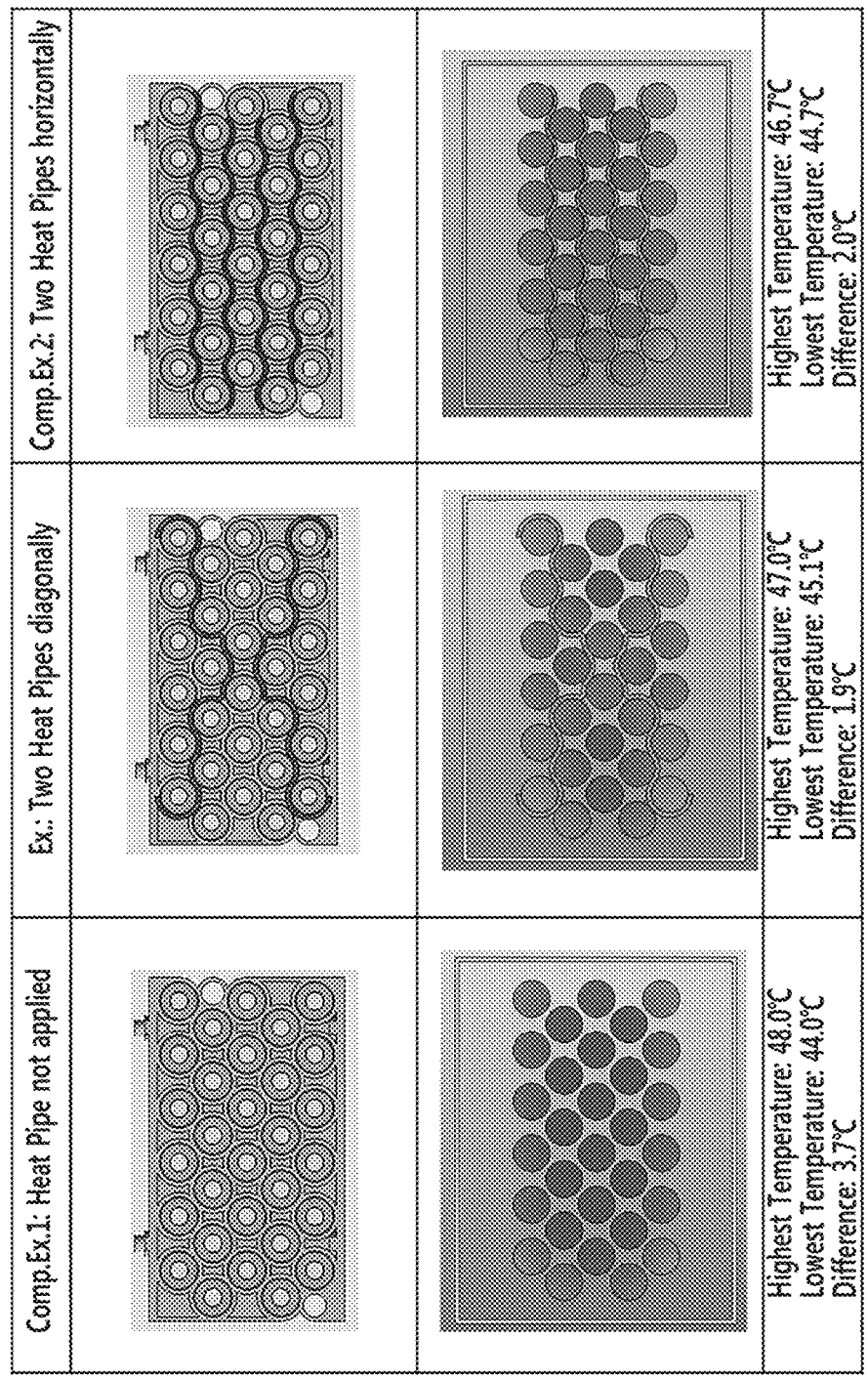
FIG. 15 is a table showing the heat balances of a battery pack according to an embodiment of the present disclosure and battery packs according to comparative examples, estimated by thermal analysis of a simulation program.

FIG. 15 is a table showing the heat balances of a battery pack according to an embodiment of the present disclosure and battery packs according to comparative examples, estimated by thermal analysis of a simulation program.

The inventors of the present disclosure prepared battery modules according to Comparative Example 1, the Example and Comparative Example 2 as follows.

Specifically, the battery module according to Comparative Example 1 includes all components of the battery module of the present disclosure, except for the heat pipe.

Also, the battery module according to the Example has the same configuration as the battery module shown in FIG. 6. That is, compared to Comparative Example 1, the battery module of this Example further includes two heat pipes extending diagonally from the center.

In addition, the battery module according to Comparative Example 2 includes four heat pipes extending in the horizontal direction. That is, the battery module of Comparative Example 2 has the same configuration as the battery module shown in FIG. 6, except for the heat pipe.

Also, the inventors of the present disclosure estimated the heat balance of the battery modules according to the Example, Comparative Example 1 and Comparative Example 2 by using the thermal analysis of a simulation program. At this time, the simulation program was FloEFD (made by Mentor Graphics), and the set environment temperature was 25° C. Also, each battery module was discharged for 3,600 seconds at a current of 1 C (discharging with 3.1 A per battery cell), and then the temperature of the cylindrical battery cells was analyzed and estimated. Also, the analysis results are shown in the table of FIG. 15.

As a result of the estimation, as shown in the table of FIG. 15, the temperature difference between the cylindrical battery cells included in the battery module according to the Example is 1.9° C. That is, the battery module according to the Example has the lowest temperature difference, compared to the battery module of Comparative Example 1 (3.7° C.) without a heat pipe and the battery module of Comparative Example 2 (2.0° C.) with four heat pipes. In particular, the battery module of Comparative Example 2 has a higher temperature difference than the battery module of the Example using two heat pipes, even though it uses four heat pipes.

This proves that the battery module of the Example is capable of effectively increasing the cooling effect of the heat pipe by setting the positions of the center and both ends of the heat pipe in consideration of the position of the cylindrical battery cell exhibiting the highest temperature among the plurality of cylindrical battery cells and the position of the cylindrical battery cell exhibiting the lowest temperature at the time of charging and discharging. In other words, the battery module of the present disclosure may effectively optimizes the thermal balance of the battery cells in the battery module by effectively cooling the cylindrical battery cells in the central portion where heat is accumulated much, among the plurality of cylindrical battery cells, thereby increasing the lifetime of the battery module.

Meanwhile, even though terms indicating directions such as "up", "down", "right", "left", "front" and "rear" are used in this specification, it will be apparent to those skilled in the art that these terms are only for convenience of explanation and may vary depending on the position of a target to be observed or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 1000: battery pack | 100: cylindrical battery cell |
| 200: battery module | 111: first electrode terminal |
| 260: heat pipe | 112: second electrode terminal |
| 262: outer wall | 230: first current collection plate |
| 264: coolant | 240: second current collection plate |
| 265: wick | 250: bus bar |
| 267: curved portion | 270: tray |
| 268: radiation pin | 272: loading portion |
| 210: module housing | 274: sidewall |
| 210A: upper case | 280: heat conduction pad |
| 210B: lower case | 263: polymer layer |
| 212A: first accommodation portion | |
| 212B: second accommodation portion | |
| 213: concave groove | |
| 215: perforation hole | |

What is claimed is:

1. A battery module, comprising:
a plurality of cylindrical battery cells, each having a battery can standing vertically so that electrode terminals are respectively formed at an upper portion and a lower portion thereof, the battery can having a side portion coated with an electrical insulation member, the plurality of cylindrical battery cells being arranged in a horizontal direction;
a module housing having an accommodation portion formed therein to accommodate the plurality of cylindrical battery cell;
a heat pipe having an outer wall to form a sealed tube structure, the tube structure including a coolant therein, the heat pipe including a wick located to surround an inner wall of the tube structure and having a plurality of micropores formed therein, the heat pipe extending in a horizontal direction along the plurality of cylindrical battery cells, the heat pipe having a plate shape and provided to stand so that both surfaces thereof are oriented in a horizontal direction; and
a tray having a loading portion provided to load the module housing on an upper surface thereof and a sidewall extending upwards along an outer wall of the module housing from an outer circumference of the loading portion,
wherein both ends of the heat pipe contact the sidewall of the tray.

2. The battery module according to claim 1,
wherein the heat pipe has a curved portion with a curved shape in a horizontal direction so that both surfaces thereof are adhered to at least a portion of an outer surface of the cylindrical battery cell.

3. The battery module according to claim 1,
wherein each of both surfaces of the heat pipe in a horizontal direction extends to face at least a portion of an outer surface of at least one cylindrical battery cell.

4. The battery module according to claim 3,
wherein the plurality of cylindrical battery cells are arranged in a plurality of rows and columns, and
wherein the heat pipe is located at one horizontal side or the other horizontal side of the plurality of cylindrical battery cells arranged at a center row or a center column.

5. The battery module according to claim 3,
wherein the plurality of cylindrical battery cells are arranged in a plurality of rows and columns, and
wherein both ends of the heat pipe in a direction extending along the plurality of cylindrical battery cells are located to face a cylindrical battery cell located at an outer row, or an outer column, or an outer row and an outer column, among the plurality of cylindrical battery cells, and a center of the heat pipe in a direction extending along the plurality of cylindrical battery cells is located to face a cylindrical battery cell located at an inner row, or an inner column, or an inner row and an inner column, among the plurality of cylindrical battery cells.

6. The battery module according to claim 1,
wherein the module housing includes:
an upper case having a first accommodation portion with a hollow structure to surround an outer side surface of an upper portion of the cylindrical battery cell; and
a lower case coupled to a lower portion of the upper case and having a second accommodation portion with a hollow structure to surround an outer side surface of a lower portion of the cylindrical battery cell,
wherein a concave groove that is partially recessed inwards is formed at a lower portion of the first accommodation portion and an upper portion of the second accommodation portion, respectively, so that the heat pipe is inserted therethrough.

7. The battery module according to claim 6,
wherein the module housing has a perforation hole formed so that both ends of the heat pipe in a longitudinal direction protrude out of the module housing.

8. The battery module according to claim 7,
wherein radiation pins are formed at outer surfaces of both ends of the heat pipe, which are exposed to the outside through the perforation hole of the module housing.

9. The battery module according to claim 8,
wherein both ends of the heat pipe and at least a part of the radiation pins contact the sidewall of the tray.

10. The battery module according to claim 1,
wherein the electrode terminals of the cylindrical battery cell include a first electrode terminal formed at an upper end of the battery can and a second electrode terminal formed at a lower end of the battery can, and
wherein the battery module includes:
a first current collection plate loaded at an upper portion of the module housing and electrically connected to the first electrode terminal of the cylindrical battery cell;
a second current collection plate loaded at a lower portion of the module housing and electrically connected to the second electrode terminal of the cylindrical battery cell; and
a heat conduction pad being electrically insulating and located at a lower surface of the second current collection plate,
wherein the heat pipe is located at a lower surface of the heat conduction pad so that the electrically-insulating heat conduction pad is interposed between the second current collection plate and the heat pipe.

11. The battery module according to claim 1,
wherein the coolant contacts the wick.

12. The battery module according to claim 11,
wherein the inner surface of the outer wall has a region where the wick is not formed so that the coolant is in direct contact with the outer wall.

13. A battery module, comprising:
a plurality of cylindrical battery cells, each having a battery can standing vertically so that electrode terminals are respectively formed at an upper portion and a lower portion thereof, the battery can having a side portion coated with an electrical insulation member, the plurality of cylindrical battery cells being arranged in a horizontal direction;
a module housing having an accommodation portion formed therein to accommodate the plurality of cylindrical battery cell;
a heat pipe having an outer wall to form a sealed tube structure, the tube structure including a coolant therein, the heat pipe including a wick located to surround an inner wall of the tube structure and having a plurality of micropores formed therein, the heat pipe extending in a horizontal direction along the plurality of cylindrical battery cells, the heat pipe having a plate shape and provided to stand so that both surfaces thereof are oriented in a horizontal direction; and
a tray having a loading portion provided to load the module housing on an upper surface thereof and a sidewall extending upwards along an outer wall of the module housing from an outer circumference of the loading portion,
wherein the outer wall of the heat pipe has a polymer layer, and the polymer layer is configured to be melted and swept away when the battery has a temperature greater than a predetermined level, and
wherein both ends of the heat pipe contact the sidewall of the tray.

14. The battery module according to claim 13,
wherein the coolant contacts the wick.

15. The battery module according to claim 14,
wherein the inner surface of the outer wall has a region where the wick is not formed so that the coolant is in direct contact with the outer wall.

16. A battery pack, comprising at least one battery module defined in claim 1.

17. A device, comprising a battery pack defined in claim 16.

* * * * *